United States Patent
Kang

(10) Patent No.: US 8,246,061 B2
(45) Date of Patent: Aug. 21, 2012

(54) SUB-FRAME MOUNT FOR SUSPENSION

(75) Inventor: Hee Gon Kang, Anyang (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 501 days.

(21) Appl. No.: 12/498,848

(22) Filed: Jul. 7, 2009

(65) Prior Publication Data
US 2010/0102543 A1    Apr. 29, 2010

(30) Foreign Application Priority Data
Oct. 24, 2008 (KR) .................. 10-2008-0104901

(51) Int. Cl.
B62D 21/11 (2006.01)

(52) U.S. Cl. ............ 280/124.109; 280/784; 180/232; 180/312; 296/204

(58) Field of Classification Search ........... 280/124.109, 280/781, 784; 180/232, 311, 312; 296/204; 188/371
See application file for complete search history.

(56) References Cited

U.S. PATENT DOCUMENTS

| | | | | |
|---|---|---|---|---|
| 3,595,335 A | * | 7/1971 | Wessells et al. | 296/187.09 |
| 5,005,849 A | * | 4/1991 | Gandiglio et al. | 280/124.109 |
| 5,251,865 A | * | 10/1993 | Kelly | 248/634 |
| 5,251,932 A | * | 10/1993 | Ide | 280/784 |
| 5,884,963 A | * | 3/1999 | Esposito et al. | 296/187.09 |
| 6,409,216 B2 | * | 6/2002 | Suzuki | 280/781 |
| 6,494,472 B2 | * | 12/2002 | Suzuki | 280/124.109 |
| 6,554,304 B2 | * | 4/2003 | Lee | 280/93.515 |
| 7,393,016 B2 | * | 7/2008 | Mitsui et al. | 280/784 |
| 7,637,514 B2 | * | 12/2009 | Kim | 280/124.109 |
| 7,857,349 B2 | * | 12/2010 | Fujiki et al. | 280/785 |
| 7,883,113 B2 | * | 2/2011 | Yatsuda | 280/784 |
| 7,958,963 B2 | * | 6/2011 | Hornisch et al. | 180/312 |

FOREIGN PATENT DOCUMENTS

| | | |
|---|---|---|
| JP | 8-156550 A | 6/1996 |
| JP | 11-171046 A | 6/1999 |
| KR | 10-0820477 B1 | 4/2008 |

\* cited by examiner

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

A sub-frame mount for a suspension may include a frame structure having an upper plate and a lower plate, a front mounting portion provided at a front portion of the frame structure, and connected to a vehicle body through a first mount bolt, and a rear mounting portion provided at a rear portion of the frame structure, and connected to the vehicle body through a second mount bolt, wherein the respective rear mounting portion includes, a first hole formed at the upper plate, a second hole corresponding to the first hole and formed at the lower plate, width of the second hole corresponding approximately to the width of the body of the second mount bolt, and a third hole connected to the second hole so that a head of the second mount bolt can pass through the third hole.

7 Claims, 6 Drawing Sheets

SUB-FRAME MOUNT FOR SUSPENSION

CROSS-REFERENCE TO RELATED APPLICATION

The present application claims priority to Korean Patent Application Number 10-2008-0104901 filed on Oct. 24, 2008, the entire contents of which application is incorporated herein for all purposes by this reference.

BACKGROUND OF THE INVENTION

1. Field of the Invention

The present invention relates to a sub-frame mount for a suspension. More particularly, the present invention relates to a sub-frame mount structure to a vehicle body.

2. Description of the Related Art

Generally, a suspension of a vehicle connects an axle to a vehicle body, prevents damage of the vehicle body and freight, and improves ride comfort as a consequence of controlling vibration, impact, and load transmitted from a road to the axle during driving not to be directly transmitted to the vehicle body.

Particularly, MacPherson-type suspensions applied mainly to small vehicles have a sub-frame provided with an upper plate and a lower plate welded together.

A steering gear box and a stabilizer bar are mounted along a width direction of the vehicle on the upper plate of the sub-frame, and lower arms are mounted at both sides of front and rear portions of the sub-frame.

A conventional sub-frame is mounted to the vehicle body through mount bolts. That is, the both sides of the front portions of the sub-frame is connected to a front portion of the vehicle body, and the both sides of the rear portions of the sub-frame is connected to a rear portion of the vehicle body.

Herein, circular penetration holes for receiving the mount bolts are formed at the both sides of the front and rear ends of the sub-frame.

The sub-frame is engaged to the vehicle body by inserting the mount bolts into the penetration holes. Therefore, the sub-frame is strongly engaged to the vehicle body.

In a case of head-on collision of the vehicle, the conventional sub-frame is pushed to the rear by impact force. At this time, since the both sides of front and rear portions of the sub-frame is fixed to the vehicle body through the mount bolts, the mount bolt and the sub-frame are moved together.

In the case of the head-on collision of the vehicle, the sub-frame is moved to the rear by an engine block. However, since the mount bolt is fixed to the vehicle body, deceleration of the vehicle body becomes increase.

As the deceleration of the vehicle body increases, the impact force transmitted to the vehicle body through the sub-frame cannot be delayed or alleviated. Therefore, riders may be injured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a sub-frame mount for a suspension having advantages of improving mounting structure of the sub-frame to the vehicle body and decreasing deceleration of the vehicle body in a case of head-on collision of the vehicle.

In an aspect of the present invention, the sub-frame mount for a suspension, may include a frame structure having an upper plate and a lower plate connected together; a front mounting portion provided at both distal sides of a front portion of the frame structure, and connected to a vehicle body through a first mount bolt; and a rear mounting portion provided at both distal sides of a rear portion of the frame structure, and connected to the vehicle body through a second mount bolt, wherein the respective rear mounting portion includes, a first hole formed at the upper plate in a longitudinal direction of the vehicle body, width of the first hole corresponding approximately to width of a body of the second mount bolt, a second hole corresponding to the first hole and formed at the lower plate in the longitudinal direction of the vehicle body, width of the second hole corresponding approximately to the width of the body of the second mount bolt, and a third hole connected to the second hole so that a head of the second mount bolt can pass through the third hole.

The respective rear mounting portion may further include a spacer mounted between the upper plate and the lower plate.

A cross-sectional shape of the spacer may be U-shape so as to support the body of the second mount bolt therein.

The spacer may be shaped open in a forward direction of the vehicle body.

The spacer may be shaped open in a forward direction of the vehicle body.

In other exemplary embodiments of the present invention, the third hole may be configured to be connected to a front end portion of the second hole.

The first hole is formed as a slot, and the second hole and the third hole may be connected to each other so as to form substantially a T-shape hole, wherein the third hole is a slot formed in a traverse direction of the vehicle body and wherein the third hole is configured to be connected to a front end portion of the second hole.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
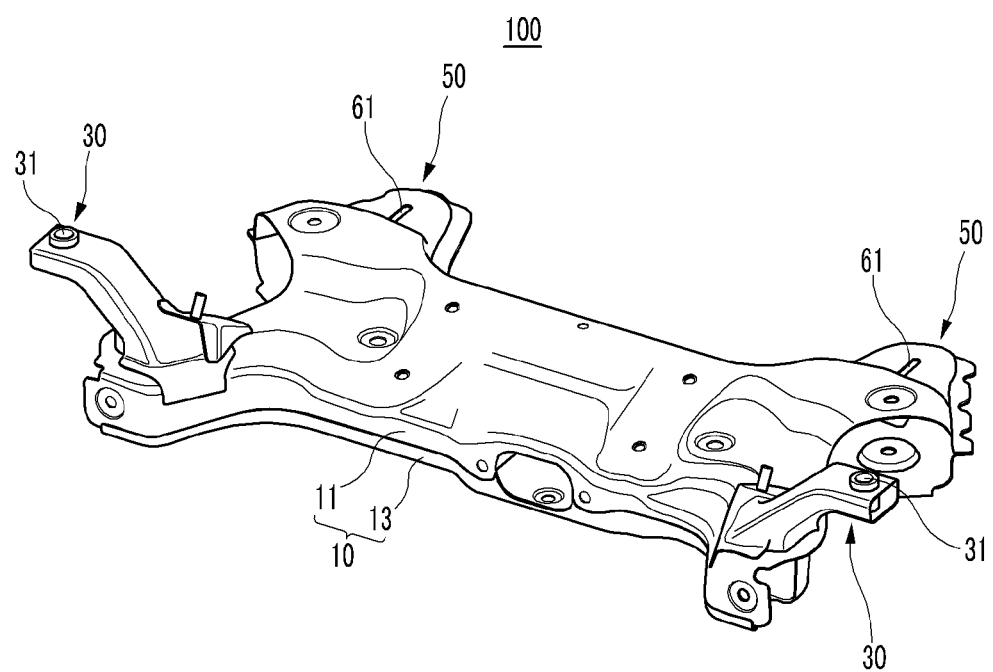
FIG. 1 is a perspective view of an exemplary sub-frame mount for a suspension according to the present invention.
Figure 2:
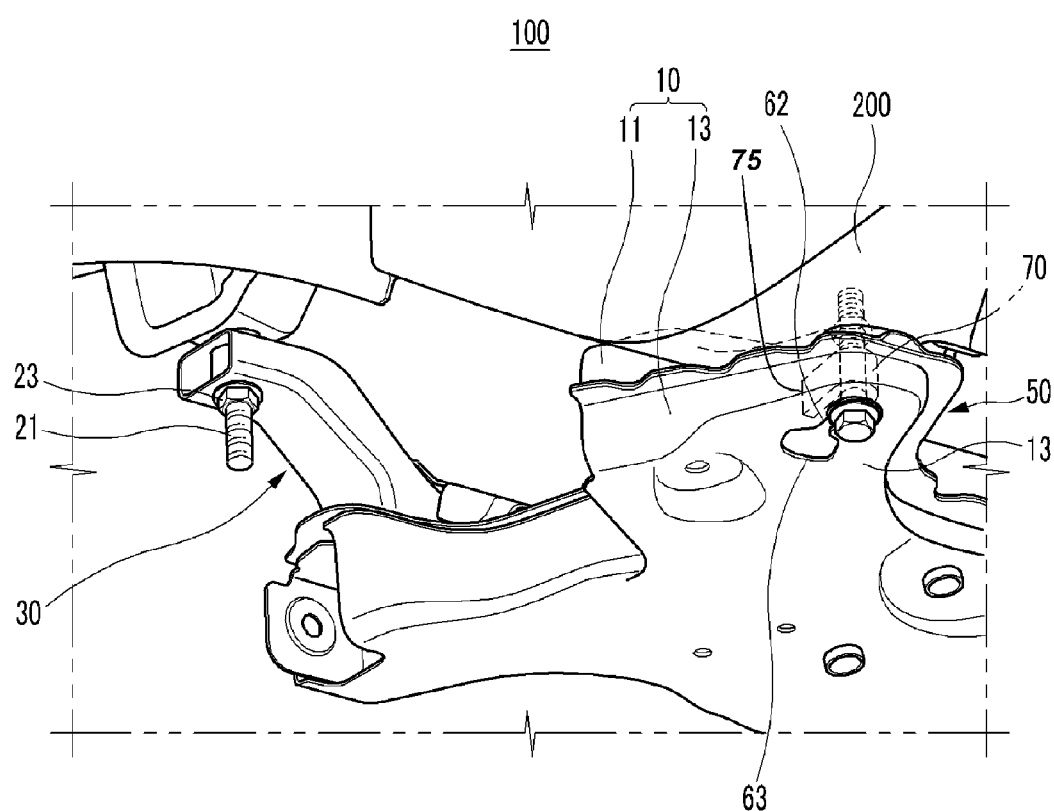
FIG. 2 is a perspective view showing an exemplary mounting structure of a sub-frame mount for a suspension according to the present invention.
Figure 3:
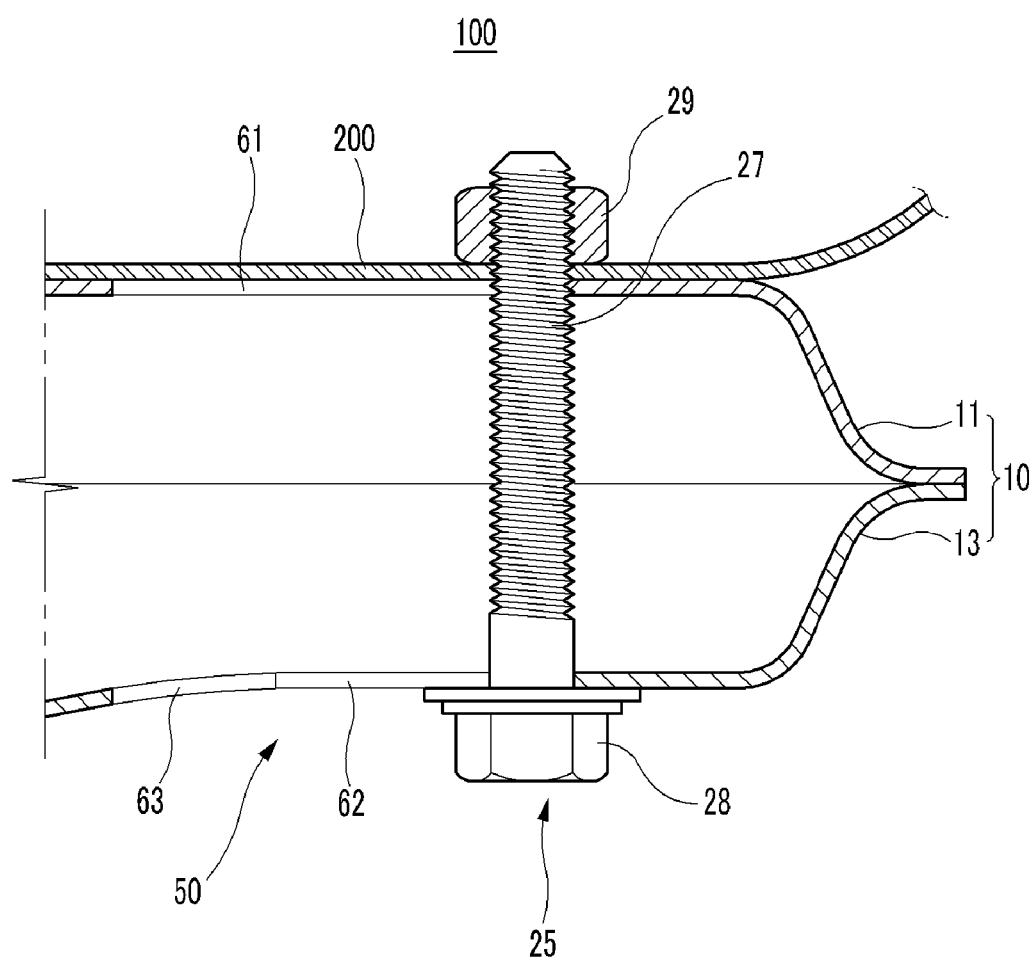
FIG. 3 is a partial cross-sectional view of FIG. 2.

FIG. 1 is a perspective view of a sub-frame mount for a suspension according to various embodiments of the present invention; FIG. 2 is a perspective view showing a mounting structure of a sub-frame mount for a suspension according to various embodiments of the present invention; and FIG. 3 is a partial cross-sectional view of FIG. 2.

Referring to the drawings, the sub-frame 100 according to various embodiments of the present invention is applied to a front suspension of a vehicle, and mainly to a MacPherson-type suspension that is applied to a small vehicle.

A steering gear box and a stabilizer bar are mounted on the sub-frame 100 along a width direction of the vehicle, and lower arms are mounted at both sides of front and rear portions of the sub-frame 100.

Herein, the sub-frame 100 loads or supports a steering system, a transmission, and an engine so as to reduce vibration and noise, and strengthens a vehicle body 200.

The sub-frame 100 is mounted to the vehicle body 200 by a mount unit (e.g., a bolt), and includes a frame structure 10 (it is generally called "a press structure") having an upper plate 11 and a lower plate 13 welded together.

According to various embodiments of the present invention, the sub-frame 100 includes a front mounting portion 30 provided respectively at both sides of a front portion of the frame structure 10 and a rear mounting portion 50 provided respectively at both sides of a rear portion of the frame structure 10.

The front and rear portions indicate front and rear portions of the vehicle body 200, respectively.

The respective front mounting portion 30 is connected to the front portion of the vehicle body 200 by a first mount bolt 21. For this purpose, a mount hole 31 through which the first mount bolt 21 penetrates is formed at the front mounting portion 30.

In this case, the first mount bolt 21 is a weld bolt and is vertically mounted respectively at the both sides of the front portion of the vehicle body 200. The first mount bolt 21 is inserted into the mount hole 31 of the front mounting portion 30, and then a nut 23 is engaged to the first mount bolt 21.

According to various embodiments of the present invention, the respective rear mounting portion 50 is connected to the rear portion of the vehicle body 200 by a second mount bolt 25.

Herein, the second mount bolt 25 includes a body 27 and a head 28. The body 27 passes through the respective rear mounting portion 50, and is engaged to a weld nut 29 provided on the vehicle body 200. The head 28 is supported by the lower plate 13 of the frame structure 10.

Figure 4:
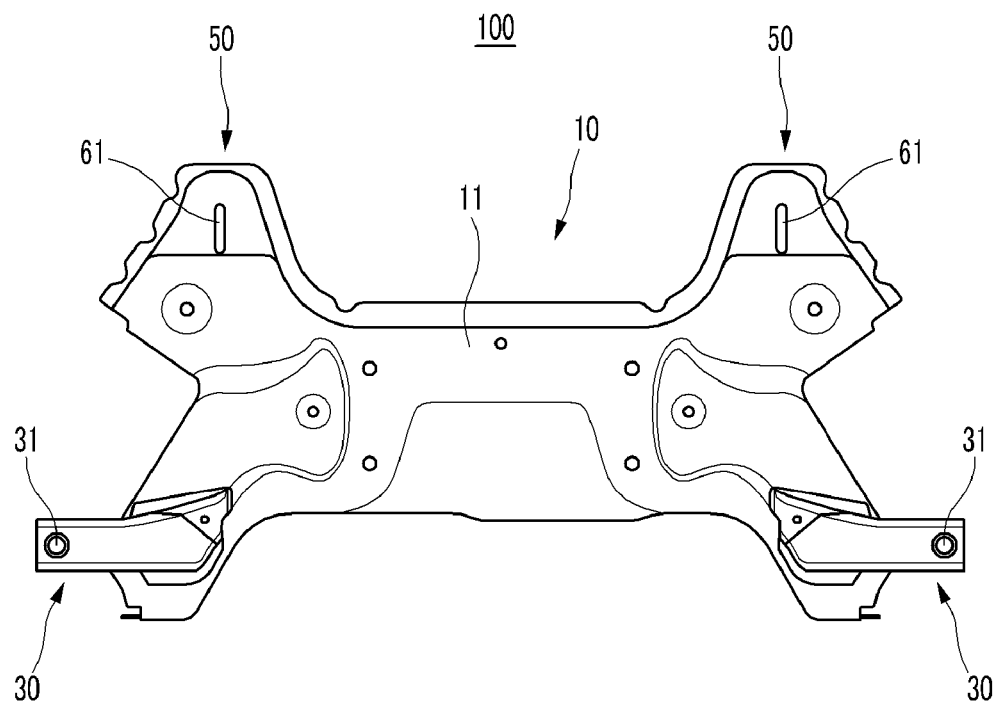
FIG. 4 is a top plan view of FIG. 1.
Figure 5:
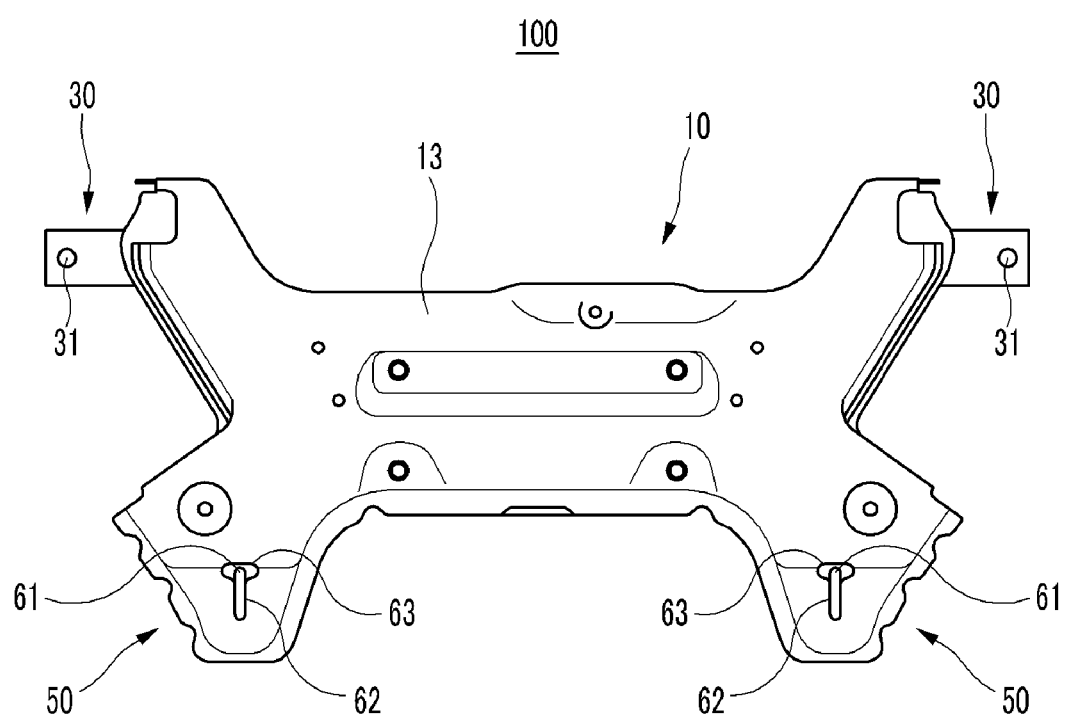
FIG. 5 is a bottom view of FIG. 1.

The rear mounting portion 50, as shown in FIG. 4 and FIG. 5, includes a first hole 61 formed at the upper plate 11 of the frame structure 10, a second hole 62 formed at the lower plate 13 of the frame structure 10, and a third hole 63 connected to the second hole 62.

The body 27 of the second mount bolt 25 penetrates vertically through the first and second holes 61 and 62, and the body 27 is guided in the first and second holes 61 and 62 in the longitudinal direction of the vehicle.

The first and the second holes 61 and 62 are formed in a longitudinal direction of the vehicle, and widths of the first and the second hole 61 and 62 substantially correspond to that of the body 27 of the second mount bolt 25.

In addition, the head 28 of the second mount bolt 25 can pass through the third hole 63 connected to the second hole 62.

According to the rear mounting portion 50, the first hole 61 of a slot type is formed at the upper plate 11, and the second and third holes 62 and 63 connected to each other so as to form substantially a T-shape hole are formed at the lower plate 13.

Also, the rear mounting portion 50, as shown in FIG. 2, may further include a spacer 70 mounted between the upper plate 11 and the lower plate 13.

According to various embodiments of the present invention, the spacer 70 between the upper plate 11 and the lower plate 13 supports the body 27 of the second mount bolt 25.

The spacer 70 between the upper plate 11 and the lower plate 13 has an upper end bonded to a rear edge of the first hole 61 and a lower end bonded to a rear edge of the second hole 62.

A cross-sectional shape of the spacer 70 is U-shape to form two legs 75 and opened toward the front end portion of the first and second holes 61 and 62.

In various embodiments of the present invention, the third hole 63 may be configured to be connected to a front end portion of the second hole 62.

Hereinafter, a mounting process and an operation of the sub-frame mount for a suspension 100 according to various embodiments of the present invention will be described in detail, with reference to the accompanying drawings.

The mounting process of the sub-frame mount for a suspension 100 according to various embodiments of the present invention will be described firstly. The front mounting portion 30 of the frame structure 10 is connected to the front portion of the vehicle body 200 by inserting the first mount bolt 21 into the mount hole 31 and engaging the nut 23 to the first mount bolt 21.

In addition, the body 27 of the second mount bolt 25 sequentially penetrates through the second hole 62 and the first hole 61 from a lower portion of the frame structure 10 and is engaged to the weld nut 29 of the vehicle body 200. Also, the head 28 of the second mount bolt 25 is supported by the lower plate 13 of the frame structure 10. Therefore, the rear mounting portion 50 is connected to the rear portion of the vehicle body 200.

Herein, the body 27 of the second mount bolt 25 is surrounded and supported by the legs 75 of the spacer 70 between the upper plate 11 and the lower plate 13 of the rear mounting portion 50.

Figure 6:
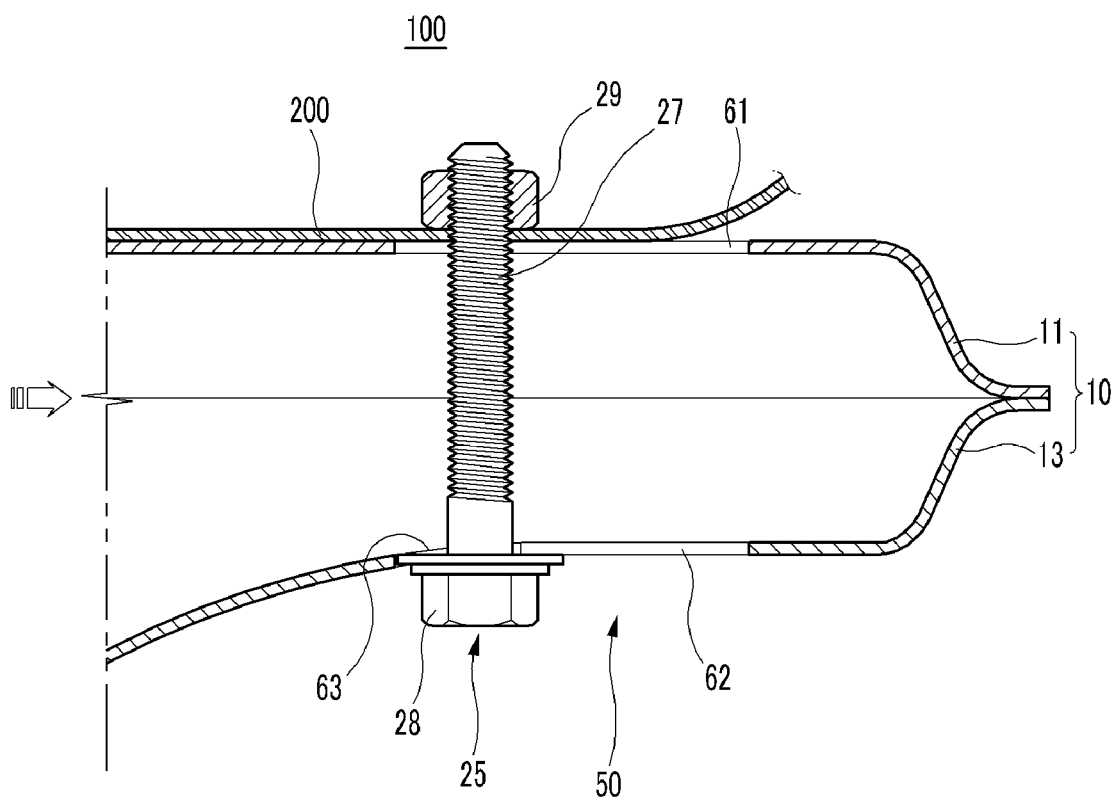
FIG. 6 is a schematic diagram showing operation of an exemplary sub-frame mount for a suspension according to the present invention.

Therefore, according to the sub-frame 100 mounted at the vehicle body 200, the frame structure 10, as shown in FIG. 6, pushed toward the rear of the vehicle body 200 in a case of head-con collision of the vehicle.

At this time, the frame structure 10 is guided by the body 27 of the second mount bolt 25 inserted in the first and second holes 61 and 62 of the rear mounting portion 50 and is pushed toward to the rear in a state that the second mount bolt 25 is fixed to the vehicle body 200.

Then, the head 28 of the second mount bolt 25 is positioned at the third hole 63 of the rear mounting portion 50, and passes through the third hole 63. Therefore, the second mount bolt 25 is departed from the frame structure 10.

Since the frame structure 10 is pushed toward the rear and is departed from the second mount bolt 25 in the state of the head-on collision of the vehicle according to various embodiments of the present invention, a maximum deceleration of the vehicle body may be reduced.

That is, impact force transmitted to the vehicle body 200 is delayed or is alleviated through the frame structure 10 departed from the second mount bolt 25 in the case of the head-on collision of the vehicle. Therefore, injury of riders may be prevented in the case of the head-on collision of the vehicle according to various embodiments of the present invention.

According to various embodiments of the present invention, engaging structure of a mount bolt to a rear mounting portion of a frame structure is improved, and thus, deceleration of a vehicle body may be reduced by departing the frame structure from the mount bolt in a case of head-on collision.

Therefore, impact force transmitted to the vehicle body may be delayed or alleviated through the frame structure departed from the mount bolt, and thus, injury of riders may be prevented.

For convenience in explanation and accurate definition in the appended claims, the terms "upper", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sub-frame mount for a suspension, comprising:
  a frame structure having an upper plate and a lower plate connected together;
  a front mounting portion provided at both distal sides of a front portion of the frame structure, and connected to a vehicle body through a first mount bolt; and
  a rear mounting portion provided at both distal sides of a rear portion of the frame structure, and connected to the vehicle body through a second mount bolt,
  wherein the respective rear mounting portion comprises:
    a first hole formed at the upper plate in a longitudinal direction of the vehicle body, width of the first hole corresponding approximately to width of a body of the second mount bolt,
    a second hole corresponding to the first hole and formed at the lower plate in the longitudinal direction of the vehicle body, width of the second hole corresponding approximately to the width of the body of the second mount bolt, and
    a third hole formed at the lower plate and connected to the second hole so that a head of the second mount bolt can pass through the third hole;
  wherein the second mount bolt is movable along the first and second hole when an external force is applied to the frame structure;
  wherein the respective rear mounting portion further includes a spacer mounted between the upper plate and the lower plate;
  wherein a cross-sectional shape of the spacer is U-shape to form two legs and surrounds the body of the second mount bolt between the legs so as to support the body of the second mount bolt therein; and
  wherein the spacer is shaped open in a forward direction of the vehicle body.

2. The sub-frame mount of claim 1, wherein the spacer is shaped open in a forward direction of the vehicle body.

3. The sub-frame mount of claim 1, wherein the third hole is configured to be connected to a front end portion of the second hole.

4. The sub-frame mount of claim 1, wherein the first hole is formed as a slot, and the second hole and the third hole are connected to each other so as to form substantially a T-shape hole.

5. The sub-frame mount of claim 4, wherein the third hole is a slot formed in a traverse direction of the vehicle body.

6. The sub-frame mount of claim 4, wherein the third hole is configured to be connected to a front end portion of the second hole.

7. The sub-frame mount of claim 1, wherein the second mount bolt passes through the third hole.

* * * * *